Oct. 3, 1939.   M. SAHYUN   2,174,862
PROCESS OF PRODUCING CRYSTALLINE INSULIN
Filed Dec. 30, 1938
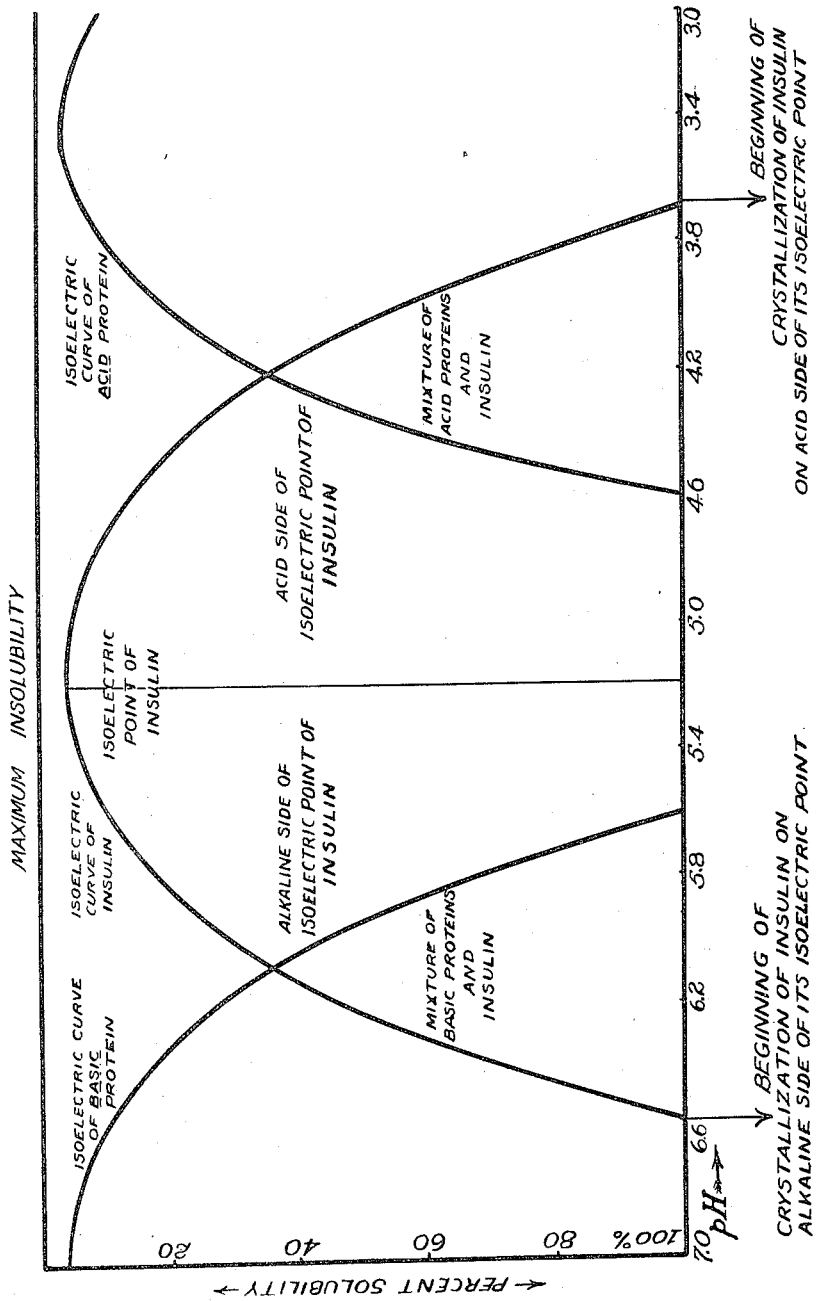
Melville Sahyun, INVENTOR.
BY Charles W. Mortimer, ATTORNEY.

Patented Oct. 3, 1939

2,174,862

UNITED STATES PATENT OFFICE 2,174,862

PROCESS OF PRODUCING CRYSTALLINE INSULIN

Melville Sahyun, Detroit, Mich., assignor to Frederick Stearns & Company, Detroit, Mich., a corporation of Michigan Application December 30, 1938, Serial No. 248,487

2 Claims. (Cl. 167—75)

This invention relates to the preparation of the pancreatic hormone, insulin, and to its crystallization from crude or other extracts of pancreatic tissue or glands or fractions thereof.

One of the objects of this invention is to provide a simple and practical method by which the pure hormone, insulin, can be recovered in a crystalline state. Another object of this invention is to obtain a larger yield of insulin in crystalline form than can be obtained by the use of methods heretofore known.

By the recovery of insulin in a crystalline state in accordance with this invention a pure product can be obtained free from objectionable amounts of organic and inorganic impurities that would otherwise be present in extracts from tissues.

In purification processes of this sort, the separation of the desired substance from similar substances that may be found in the same extract presents a difficult and painstaking task. The task is even more difficult when it is required to obtain the substance in the form of well defined crystals in order to be sure that the product is pure.

When crystalline insulin is obtained for example by treating a highly purified amorphous insulin with a mixture of pyridine and brucine and adjusting the acidity to pH 5.6, the yield is low seldom exceeding 10 to 15 per cent. Insulin has also been crystallized by employing solutions of saponin and digitonin, at an acidity of pH 5.6. The yield of insulin crystals is not more than about 10 per cent of the starting material when digitonin is used and 5 to 15 per cent when saponin is used. Even when a phosphate buffer and acetone are used to crystallize amorphous insulin to which zinc has been added not more than a 50 per cent yield is obtained. The insulin thus obtained is not of sufficient purity and consequently has to be recrystallized, so that the final yield of crystalline insulin is only about 40 per cent of the starting material.

Prior processes of crystallizing insulin are not satisfactory for the commercial preparation of crystalline insulin because the makers were not always certain of being able to produce crystalline insulin either from crude or highly purified amorphous insulin, the yields were low, the cost was high and technical difficulties were great.

Attempts to prepare crystalline insulin heretofore for commercial purposes have therefore not been entirely satisfactory because no reliable method was known that would enable one with certainty to obtain such insulin from sources of insulin that were available, in addition to the facts that the yields from prior processes were low and technical difficulties in attempts to carry out the processes were encountered.

Crystalline insulin has been a scientific curiosity, that was used sparingly for purposes of investigations and in some instances as a standard for the physiological assay of commercial insulin preparations.

By the present invention impurities are removed from insulin, the insulin is recovered in crystalline form and a large yield is obtained. In accomplishing this result substances are removed from insulin or pancreatic extracts which substances would interfere with crystallization; also the insulin is fractionally crystallized by the gradual adjustment of the hydrogen ion concentration and by gradual changes in temperature.

Insulin is a protein and therefore possesses amphoteric properties. Its potency is destroyed either by strong acids or by alkalis or by boiling; it can be precipitated by the well known protein precipitants; it possesses a definite isoelectric point; it flocculates when brought into contact with protamines and protamine-like substances at or near neutrality; it has a high molecular weight; and upon hydrolysis it yields aminoacids.

For the successful crystallization of insulin by the present process one should get rid of impurities including those substances that would interfere with the process of crystallization and one needs to be careful as to the concentration of the insulin solution, and it is best to have certain other elements present. Also the proper reagents, both buffers and solvents, should be employed and the proper pH and temperature of the solution should be maintained.

As to the substances or impurities that would interfere with the process, it may be stated that if the other conditions listed above are fulfilled it is possible to obtain a crystalline preparation from crude insulin. However the yield is uncertain and of poor quality. The nature of such impurities may vary considerably in any given extract of the pancreas depending to a large extent on the method of extraction and the skill of the chemist. In most extracts from the pancreas containing insulin two types of impurities are encountered; those that are inert and do not interfere with crystallization, such as inorganic salts, amino-acids, peptides, etc., which are usually present or formed during the process of extraction and those, such as inactive proteins, etc., that do interfere with crystallization. The latter give the most trouble for unless they are removed, no matter how skilled a person may be in the art of crystallization he can neither realize a good yield nor obtain a pure crystalline preparation. By the present invention a simple, inexpensive method has been provided for the removal of substances from pancreas extracts that would interfere with the crystallization of insulin therefrom.

At least two groups of these interfering substances are found in the pancreatic extracts which contain insulin. One group consists of proteins or protein-like substances that are alkaline in character and become insoluble at about pH 7.0 and the other group consists of proteins or protein-like substances that are acidic in character and become insoluble at about pH 3.5, provided certain conditions are fulfilled as will be more fully explained below.

Since insulin exhibits amphoteric properties that are due to the presence of active carboxyl and hydroxyl groups in the molecule, it can react with either alkaline or acid compounds.

The accompanying drawing is a chart showing iso-electric curves of basic protein, insulin, and acid protein, respectively. This chart shows the relative isoelectric curves which in a certain sense are measures respectively of the insolubilities of insulin and of the substances just described which interfere with crystallization of insulin.

In order to appreciate the effect of the presence of these substances which interfere with crystallization of insulin, it should be stated that a more satisfactory crystalline product is obtained at a pH at which the substance is on the verge of insolubility. In the crystallization of insulin where a number of conditions must be fulfilled for satisfactory results, the hydrogen ion concentration is very important. In carrying out this invention the acidity of a solution of insulin and these interfering substances is adjusted to pH 6.6 or even nearer neutrality and the solution is heated to about 60° C. where insulin is theoretically in solution, whereupon a considerable precipitate develops which consists of at least basic protein and some insulin. If this precipitate were not removed the insulin precipitate that is formed later by gradually changing the pH towards the isoelectric point of insulin would be mixed with it so that the total precipitate would be a mixture of substances, part of which may or may not be crystalline. However, by my process the separation of insulin from this precipitated basic protein is effected by removing this fraction of the precipitate from the mother liquor before the pH is decreased any or much. The solid matter that separates out at pH 6.6 or thereabout, and is removed, is redissolved separately in water and the acidity is adjusted to about pH 2.5, and the mixture is filtered. The acidity of the clear filtrate thereby obtained is next adjusted to about pH 5.0 to precipitate any insulin present. If no precipitate forms, the material is discarded. Whatever precipitate is formed is centrifuged and dissolved in acidified water. This precipitate contains insulin. The insulin may be crystallized therefrom separately as described below, or it may be added to another insulin-containing fraction and crystallized out in the same way.

The adjustment of the acidity to about pH 6.6 or even nearer neutrality precipitates all or nearly all of the alkaline protein and sometimes as much as about 25 per cent of the insulin from the original solution. After the basic proteins have been separated, as for example by filtration, at an acidity of about pH 6.6 or nearer neutrality insulin begins to crystallize out of the mother liquor as its temperature reaches room temperature, that is about 20° to 25° C. The acidity is then gradually increased while the mixture is being gradually cooled until an acidity of about pH 6.0 and a temperature of about 4° C. are reached, whereupon most of the amorphous insulin crystallizes out upon standing in the cold. The insulin crystals thus formed are separated out and the acidity of the mother liquor is then increased to about pH 5.2. The precipitate formed at about pH 5.2 consists of insulin and impurities such as acidic proteins. This precipitate is dissolved in dilute sulfuric acid and the acidity is then adjusted to about pH 3.5 whereupon the acidic proteins are precipitated and are removed as by filtration. Insulin sulphate remains in solution. It is precipitated at its isoelectric point at about pH 5.2, centrifuged and the process described below for crystallization of insulin is applied to it.

As to the concentration of the insulin containing solution that should be used I have found that if a highly concentrated insulin containing solution, i. e., in excess of about 100 units of insulin per cc., is used, the crystallization does not always proceed satisfactorily, and the insulin crystals that are formed are quite often contaminated with impurities and require recrystallization. On the other hand if the concentration of the insulin containing solution is less than about 20 units of insulin per cc., large crystals are formed but a considerable loss in yield occurs due to solubility of insulin. Best results have been obtained so far by using concentrations from 50 to 100 units per cc.

As to the presence of certain essential elements needed for successful crystallization of insulin from its solutions, it has been found that the pancreas contains a considerable amount of heavy metals such as zinc, nickel and cobalt which aid materially in the crystallization. These metals are probably eliminated for the most part in the earlier steps of recovering insulin from the alcoholic extract of the pancreas. It has been observed that the presence of any of these metals facilitates the crystallization of insulin from solutions.

I have found that soluble salts of zinc, cobalt, nickel and cadmium are useful not only to facilitate the formation of insulin crystals by chemical combination with insulin but also to cause a sharper separation of the basic proteins from the insulin at about pH 6.6 to neutrality. This is probably due to the amphoteric properties and adsorbing power of the salts of these metals, particularly zinc. For example, zinc chloride is soluble in slightly acidified water but upon the addition of an alkali, especially in the presence of a phosphate buffer, basic zinc salts are formed which begin to flocculate at an acidity of about pH 6.0. When a solution containing insulin and a zinc or other metal salt is made more alkaline most of the uncombined zinc or excess zinc or other metal that is not taken up by or combined with the insulin precipitates out along with the insoluble basic proteins. At times these insoluble proteins have been observed to have the tendency to form a colloid if an excess of zinc or other metal has not been added.

As to the buffer that should be used in my process, it has been found by studying the isoelectric curve of insulin as shown on the accompanying chart that insulin is most insoluble at about pH 5.2 and that as the solution becomes more alkaline or more acid, a greater amount of insulin goes into solution until a pH is reached, in either direction from the isoelectric point, where insulin is completely soluble. Therefore, for satisfactory crystallization the insulin should be allowed to come out of solution slowly by gradually either increasing or decreasing the acidity from the isoelectric point. That is, the invisible particles of insulin should be permitted to grow slowly until their size comes within microscopic range. This process of pH adjustment and crystallization can be accomplished on either side of the isoelectric point. It can best be accomplished on the alkaline side of the isoelectric point by using a buffer whose optimum buffer effect is at about pH 6.6, or on the acid side of the isoelectric point by using a buffer whose optimum buffer effect is at about pH 3.7. If it is desired that the crystallization should proceed on the alkaline side of the isoelectric point, phosphate or acetate buffers or the like should be employed while if it is desired that the crystallization should proceed on the acid side of the isoelectric point, citrate or phthalate buffer or the like should be employed.

The amount of buffer required for the crystallization of insulin from its solution varies from about 1/20 to about 1/40 molar. A higher concentration of buffer sometimes causes a salting-out effect and a smaller amount is usually not satisfactory. I have found that large crystals of insulin are best obtained by the use of the 1/40 molar buffer, while by the use of a more concentrated buffer the insulin crystals are smaller but the yield is larger.

As to the solvents that should be used in the crystallization of insulin, it has been found that organic solvents should be used, although the function they perform is not clearly understood. It has been found that the presence of such a solvent is of considerable aid provided the amount used is not more than about 15 per cent of the total volume of the solution. I have found that any one or more of a large number of organic solvents are very useful in the crystallization of insulin and in producing a large yield of well defined crystals. It is possible that the organic solvents function by lowering the surface tension, or by increasing the solubility of amorphous material and decreasing the solubility of crystalline material or by depressing the ionization constant of the liquid or possibly by two or more of these effects.

Some of the organic solvents that have been found to be useful in the crystallization of insulin are: acetone, propyl alcohol, butyl alcohol, butyl carbitol, carbitol acetate, cellosolve, triethylene glycol, dioxan, ethylene glycol, methyl carbitol, methyl cellosolve, methyl cellosolve acetate, propylene glycol etc. Most of these solvents are either completely or partly miscible with water.

As to the hydrogen ion concentration of the insulin containing solution, it is obvious from the accompanying chart that the pH is very important and its adjustment is essential. I have found that such bases as ammonium hydroxide, sodium hydroxide, sodium silicate, potassium hydroxide etc. are quite satisfactory for increasing the pH, although many other basic materials such as methyl amine, trimethyl amine, trisodium phosphate, sodium borate, for example, may be used for this purpose. For decreasing the pH of the solution such acids as hydrochloric, acetic, sulfuric, lactic, tartaric, sulfonic, citric acid, as well as acid salts such as sodium or potassium acid phosphate, etc., are suitable.

As to the temperatures to be used in the crystallization of insulin, I have found that this is also important. I have discovered that a temperature of about 60° C. is helpful in separating impurities such as basic proteins for example from insulin. At this temperature most of the insulin is kept in solution at pH of about 6.6 although rapid flocculation of the impurities is caused to take place. At the same time the formation of a colloid that is difficult to filter is obviated by the presence of salts of metals and the rate of reaction between zinc or other metal and insulin appears to be speeded up. After impurities have precipitated out at about 60° C. and about pH 6.6 or nearer neutrality of the mixture and been removed rapid cooling of the warm liquid from which the insulin is to be crystallized should be avoided. The lowering of the temperature should be very gradual, or at the rate of about 1° or 2° C. per hour, in order to prevent the formation of semi-crystalline insulin which would necessitate the subsequent recrystallization of the material. However, a higher rate of lowering the temperature can be used at times. After the crystallization of the insulin from the solution is well under way the solution is gradually cooled to say about 4° C. to decrease the solubility of the insulin thus causing further crystallization and increasing the yield.

The following is given as a specific example of carrying out the process, but it is to be understood that the invention is not limited to the details given in this example or to the particular materials used or proportions of materials or the exact time or temperatures given:

To approximately 1,000,000 units of an insulin preparation which may or may not be highly purified, dissolved in about 5 liters of water, add 2 liters of ½ molar potassium acid phosphate. While stirring, add about 5 grams of pure zinc chloride dissolved in 500 cc. of acidified water. The mixture may be allowed to stand at room temperature over night. Introduce about 2 liters of isopropyl alcohol and make up to a volume of 19 liters by the addition of distilled water. Cautiously and while stirring add 5 N sodium hydroxide or ammonium hydroxide until a pH of about 6.8 is reached. While stirring, heat to a temperature not to exceed about 60° C. Allow to cool at room temperature over night. Separate the solids from the mother liquor by any convenient way. Collect the clear filtrate or mother liquor and adjust the acidity with 5 N hydrochloric acid to about pH 6.6. Stir and then allow to stand at room temperature until crystallization begins. The crystallization can be hastened by the addition of a few insulin crystals. On the following day, stir again and acidify to pH 6.5, usually about 2 cc. of 5 N hydrochloric acid being sufficient. Cool gradually to about 4° C. Subsequently acidify the mixture gradually with 5 N hydrochloric acid (about 0.1 pH at a time) to about pH 6.2, and separate the precipitated insulin crystals from the mother liquor.

The precipitated matter consists chiefly of insulin crystals. One method of recovering the crystals in pure form is by centrifuging and washing. A process of washing consists in adding to the crystalline mass deposited at the bottom of the centrifuge tube warm distilled water adjusted to about pH 6.2 preferably with a few drops of a dilute buffer that is soluble in alcohol, such as ammonium or sodium acetate. It is also preferable to heat the water to about 50° C. for the purpose of dissolving such impurities as phosphate, excess zinc salts, and amorphous insulin that may remain associated with the crystals. After thorough stirring, the crystals are centrifuged, the supernatant liquid decanted and the crystalline mass deposited at the bottom of the centrifuge tube is again subjected to two or more similar washings and centrifugations using the slightly buffered distilled water heated to about 50° C. Usually after the third washing of the crystals the crystalline mass is free of most of the accompanying impurities. 95 per cent alcohol may then be added to the crystals and stirred. The insulin crystals suspended in alcohol may be separated by filtration through a Buchner funnel, and acetone or ether may be added for dehydration. The final drying of the insulin crystals is best accomplished in vacuum over sulfuric acid.

Acidify the mother liquor, which still contains about 20 to 30 per cent of the original amount of insulin, to about pH 5.0 with 5 N hydrochloric acid. The precipitate which forms consists chiefly of insulin and impurities such as acid proteins. Dissolve this precipitate after recovering it by centrifugation, in about 5 liters of water acidified with 5 N sulfuric acid. Adjust the acidity to about pH 3.5 and warm the material to about 60° C., and allow it to stand for a few hours whereupon the acid proteins precipitate out. Filter and adjust the acidity of the clear filtrate, which contains most of this insulin, to approximately pH 5.0 and centrifuge the insulin precipitate. Dissolve the insulin thus recovered in acidulated water, add zinc in concentration of about 0.5 mg. to every 1000 units, and phosphate buffer and isopropyl alcohol in the various proportions mentioned in the above example. Adjust the reaction to about pH 6.6, heat, filter and allow the insulin to crystallize out in the manner described.

Crystalline insulin thus prepared possesses the active hypoglycemic principle of the pancreas. It assays about 22 international units per mg. Its solutions have proven to be stable for long periods of time not only at room temperature but also under adverse conditions. Suitable solutions of crystalline insulin are prepared by weighing a desired amount of insulin crystals and dissolving them in pure redistilled water, acidified to about pH 3.0 with either hydrochloric, lactic, sulfuric, citric, tartaric or other similar acid. The solutions may be rendered isotonic by the addition of glycerine, sodium chloride, glucose or any other suitable reagent commonly used for this purpose. As a rule, phenol or tricresol is added as a perservative in concentration of 0.1 to 0.2 per cent of the final volume. Sterilization of these solutions is accomplished by any of the usual standard methods of filtration such as Berkefeld, Mandler or Chamberlin candle, or a Seitz filter. Solutions of crystalline insulin are thus rendered suitable for clinical use.

This is a continuation-in-part of my application Serial No. 65,644, filed February 25, 1936.

What is claimed is:

1. The process of crystallizing insulin, which comprises preparing an aqueous solution of insulin, said solution containing a phosphate buffer, an organic solvent and a soluble salt of one of the metals of the group consisting of zinc, cobalt, nickel and cadmium and having about 20 to about 100 units of insulin per cc. of the solution, adjusting the pH of the solution to about 6.8, heating to about 60° C., separating the precipitate from the mother liquor, gradually increasing the acidity of the mother liquor to about pH 6.0 and gradually lowering the temperature thereof to about 4° C., separating the insulin crystals thus formed, increasing the acidity of the mother liquor to about pH 5.2, removing the precipitate thus formed and dissolving it in dilute sulfuric acid, adjusting the acidity of the last named solution to about pH 3.5 and removing the resulting precipitate.

2. The process in accordance with claim 1, in which the buffer is $\frac{1}{40}$ molar.

MELVILLE SAHYUN.